United States Patent
Farr

(10) Patent No.: US 7,071,457 B2
(45) Date of Patent: Jul. 4, 2006

(54) OPTICAL FILTER STACK

(75) Inventor: Mina Farr, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/923,492

(22) Filed: Aug. 20, 2004

(65) Prior Publication Data

US 2005/0018186 A1    Jan. 27, 2005

Related U.S. Application Data

(62) Division of application No. 10/117,278, filed on Apr. 5, 2002.

(60) Provisional application No. 60/358,505, filed on Feb. 19, 2002.

(51) Int. Cl.
*H01J 3/14* (2006.01)
*H01J 40/14* (2006.01)
*H01J 5/16* (2006.01)

(52) U.S. Cl. .................. 250/216; 250/226; 359/890

(58) Field of Classification Search ................ 250/216, 250/226; 356/890; 359/810
See application file for complete search history.

(56) References Cited

U.S. PATENT DOCUMENTS

| | | | |
|---|---|---|---|
| 3,929,398 A | | 12/1975 | Bates |
| 3,943,019 A | | 3/1976 | Krekeler et al. |
| 4,554,447 A | | 11/1985 | Howard et al. |
| 4,701,009 A | | 10/1987 | Tangonan et al. |
| 4,790,654 A | | 12/1988 | Clarke |
| 4,957,371 A | * | 9/1990 | Pellicori et al. ............ 356/419 |
| 5,112,125 A | | 5/1992 | Neumann |
| 5,166,755 A | | 11/1992 | Gat |
| 5,504,575 A | | 4/1996 | Stafford |
| 5,774,278 A | | 6/1998 | Kaplan |
| 5,784,507 A | * | 7/1998 | Holm-Kennedy et al. .... 385/31 |
| 5,832,148 A | | 11/1998 | Yariv |

* cited by examiner

*Primary Examiner*—Stephone B. Allen
*Assistant Examiner*—Patrick J. Lee
(74) *Attorney, Agent, or Firm*—Workman Nydegger

(57) ABSTRACT

Optical devices and related methods are provided. One example of the optical device includes two or more optical members joined together to form a stack. Each of the optical members in the stack includes a reflecting surface that has a corresponding slope, where the slope of each reflecting surface is different. In addition, disposed on each reflecting surface is a material that is reflective for a particular wavelength of light, so that each optical member reflects a different wavelength, and so that the optical members in the stack are able to collectively image the reflected signals onto a two dimensional detection plane.

28 Claims, 6 Drawing Sheets

OPTICAL FILTER STACK

RELATED APPLICATIONS

This application is a divisional, and claims the benefit, of U.S. patent application Ser. No. 10/117,278, entitled WEDGED OPTICAL FILTER STACK, filed Apr. 5, 2002, which, in turn, claims the benefit of U.S. Provisional Patent Application Ser. No. 60/358,505, entitled WEDGED OPTICAL FILTER STACK, and filed Feb. 19, 2002. Both of the aforementioned applications are incorporated herein in their respective entireties by this reference.

BACKGROUND OF THE INVENTION

1. The Field of the Invention

This invention relates generally to optical spectroscopy devices and techniques. In particular, the present invention relates to optical filtration and spatial positioning devices for use in the analysis of multiple channels of a light signal.

2. Related Technology

Spectroscopy is a well known technique that involves the production and investigation of the spectral content of polychromatic light. Such forms of light are made up of numerous different wavelengths, and spectroscopy allows for the analysis of these individual wavelengths. This form of analysis has broad applications in fields such as chemistry, biology and telecommunications. For example, a common application utilizes a device known as a spectroscope, which sends a light signal through a sample and then disperses the individual wavelengths of the emitted light signal onto a grid. The characteristics of the sample composition can then be identified depending on which wavelengths are actually emitted. The spectral information can be used to identify the sample in much the same way that a fingerprint can be used to identify an individual in that no two elements emit the same spectra.

Another important application of spectroscopy is in the field of optical communications. As a transmission medium, light provides a number of advantages over traditional electrical communication techniques. For example, light signals allow for extremely high transmission rates and very high bandwidth capabilities. Also, light signals are resistant to electromagnetic interferences that can interfere with electrical signals. Light also provides a more secure signal because it does not emanate the type of high frequency components often experienced with wire-based electrical signals. Light also can be conducted over greater distances without the signal loss typically associated with electrical signals on copper wire.

Another advantage in using light as means of communication is that multiple wavelength components of light can be transmitted through a single communication path such as an optical fiber. These individual wavelength components or optical channels can transmit through the fiber independently without any crosstalk. This process is commonly referred to as wavelength division multiplexing (WDM), where the bandwidth of the communication medium is increased by the number of independent wavelength channels used. Spectroscopy techniques can be used to investigate and verify the presence of these different wavelength channels by separating light signals into constituent wavelength sets or channel groups.

One problem associated with the use of spectroscopy techniques—especially in optical communications—is the difficulty in dispersing the individual light signal wavelengths in a manner that can be efficiently and accurately detected at a very high resolution. This is especially the case in dense wavelength division multiplexing (DWDM) applications where the individual wavelength communication channels are closely spaced to achieve higher channel density and total channel number in a single communication line. For example, most spectroscopy devices use a prism or a diffraction grating device as a dispersion member to separate wavelength components. However, these devices separate the wavelengths in a linear manner, such that they are dispersed along a particular plane. Thus, to detect the dispersed wavelengths, detectors must be placed along a line in a corresponding plane. The number of required detectors is proportional to the number of detected wavelengths and desired resolution. Thus, to detect a broad range of wavelengths, a very long line of detectors must be employed, which takes up a relatively large amount of space and increases the overall cost and complexity of the optical communications system.

Another approach is to use a mechanical device to aim the different wavelengths at a single detector for correspondingly different time periods. For example, a rotating reflective diffraction grating can be used to direct the individual wavelengths to a single detector location for a specific time period Again, this approach has several drawbacks. While it reduces the number of detectors required, it utilizes devices with moving parts and having relatively high mechanical complexity, thereby increasing cost and reducing reliability. Moreover, the approach can be inefficient. For example, if a large number of wavelengths are involved, the approach introduces a relatively large time delay, an especially undesirable characteristic in any communications application.

Yet another problem encountered when utilizing such spectral analysis techniques is related to the accurate detection of the particular channels in question. In particular, if the physical dispersion of individual wavelengths is too narrow or the sampling detectors elements too few, there is a risk of focusing unwanted wavelength(s) onto the same detector elements as the desired wavelength. This would obviously create noise and distort the information contained within the desired channel. More expensive high dispersion diffraction gratings can be obtained to disperse the wavelengths into a broader area and therefore onto a sufficient number of detector elements per wavelength channel to allow high resolution and accurate detection. However, this solution requires a large number of linear detector elements, additional space, and more complex and expensive focusing optics. Therefore, most spectroscopy applications must balance the need for higher resolution with the expense and size ramifications of using a broader dispersion member.

Therefore, there is a need for an inexpensive device that can enable the use of a less complex and more reasonable detector array as well as a relatively inexpensive dispersion element, yet provides an accurate high resolution detection of the desired wavelengths within a broad range of wavelengths.

BRIEF SUMMARY OF AN EXEMPLARY EMBODIMENT OF THE INVENTION

These and other problems in the prior art are addressed by embodiments of the present invention, which relates to an optical device that is capable of accurately and efficiently separating and imaging the constituent wavelengths of a light signal onto a two-dimensional detection plane. Moreover, the device reflects and spatially positions the selected wavelengths onto a two-dimensional detector array, thereby allowing the use of a less complex two-dimensional imaging array generally used in digital imaging applications, as opposed to an unreasonably long linear detector array made specifically for high cost scientific applications. Embodiments of the present invention are thus particularly suitable for spectral wavelength separation, as would be done in typical spectroscopy systems and applications. For example, a system that would normally require a large amount of detector space could incorporate an optical filter device constructed according to the teachings of the present invention to perform the same task in substantially less expensive two-dimensional detector space.

In general, presently preferred embodiments are directed to an optical reflection device. The reflection device includes a plurality of optical members, each having a reflective surface that includes at least one reflective layer. Each reflective layer is composed of a material that reflects a specific range of wavelength components of an incident light signal, and that allows other wavelengths to pass through the layer. In preferred embodiments, the plurality of optical members are interconnected in a manner such that the reflective surfaces are oriented at distinct reflective angles with respect to one another. This angled configuration allows each optical member to reflect an individual set of wavelength components at an angle that is different from that of the other optical members, i.e., each set of wavelength components is reflected at a predetermined angle. This configuration allows the optical reflection device to very precisely reflect individual wavelengths that are dispersed from a dispersing member, such as a prism or a diffraction grating, towards specific points on a corresponding detector.

The advantages of the present invention over the prior art include the ability to individually filter and reflect optical wavelengths, or channels, to specific optical detector locations. By filtering and reflecting individual channels in this manner, embodiments of the present invention minimize the physical space otherwise needed for linearly detecting a broad range of wavelengths. In addition, the present invention maximizes resolution by efficiently utilizing the large number of detector elements, available in a two-dimensional detector array, for sampling individual wavelength channels.

These and other features and advantages of the present invention will become more fully apparent from the following description and appended claims, or may be learned by the practice of the invention as it is set forth below.

BRIEF DESCRIPTION OF THE DRAWINGS

In order that the manner in which the above recited and other advantages and objects of the invention are obtained, a more particular description of the invention briefly described above will be given by making reference to a specific embodiment that is illustrated in the appended drawings. These drawings depict only one embodiment of the invention and are not to be considered limiting of its scope.

DETAILED DESCRIPTION OF EXEMPLARY EMBODIMENTS OF THE INVENTION

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to an optical reflection device that receives dispersed light and selectively reflects ranges of wavelengths at a specific angle. In this way, the optical reflection device is capable of reflecting and spatially positioning selected wavelengths onto a corresponding detection area on the device. Embodiments of the present invention find particular use in high resolution optical spectroscopy systems such as might be used in optical communication or sample identification applications. However, it will be appreciated that the teachings of the present invention are applicable to other optical applications as well.

Figure 1:
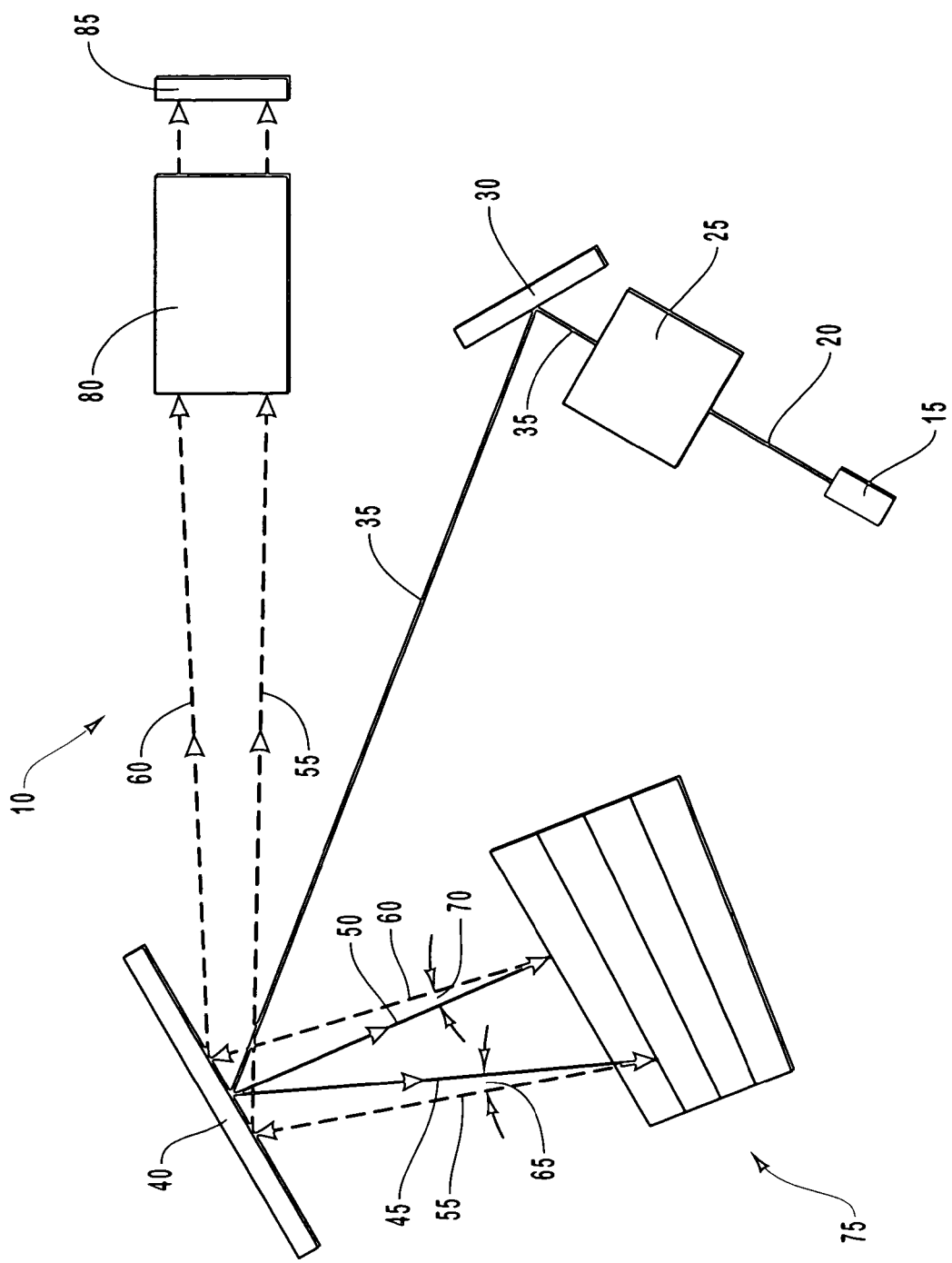
FIG. 1 is a schematic drawing of an optical spectroscopy system using one embodiment of an optical reflection device for filtration and spatial manipulation of the individual channels of a light signal.

Reference is first made to FIG. 1, which illustrates one exemplary environment, a portion of an optical spectroscopy system, designated generally at 10. In this illustrated embodiment, the novel reflection device is embodied as a wedge stack, designated generally at 75. Included within the exemplary system 10 is a light source 15, which can include any suitable source of a light signal, designated at schematic line 20, such as an optical fiber or a laser. As is shown, in a preferred embodiment the light signal 20 is emitted onto appropriate collimating optics 25, which are used to collimate the light signal 20. For example, the collimating optics can include various positive and negative lenses that are positioned together to form a system that collimates the diverging light signal 20 into a desired collimated beam, represented schematically at line 35.

The illustrated system further includes a mirror 30, which in this example is used to reflect the collimated light signal 35 towards a specific location. Multiple mirrors may be used in various configurations to organize the optical system to meet specific size constraints. Alternatively, the light source 15 and the collimating optics 25 can be positioned to directly illuminate the diffraction grating 40 without the use of a mirror.

As is also shown in FIG. 1, the diffraction grating 40 is an optical element which disperses or separates the wavelengths of an incident light beam similar to a prism. Diffraction gratings are available with various line spacing (grating pitch) to accommodate various amount of wavelength dispersion or channel separations in different optical systems. The diffraction grating 40 in the illustrated embodiment disperses the incoming collimated optical signal 35 from the mirror 30 onto the wedge stack 75. The collimated optical signal 35 is dispersed into a multitude of wavelength components by the diffraction grating. For illustration purposes, only two wavelength sets 45, 50 are shown in the figure. These wavelength sets represent appropriately chosen adjacent wavelength channels within a given set of wavelengths. The total range of wavelengths to be detected in the instrument is divided into sets of wavelengths such as 45 and 50.

The wedge stack 75 is an optical element consisting of the same number of wedges as there are wavelength sets. Each optical wedge component within the wedge stack 75 reflects and spatially positions a desired set of wavelengths and transmits an undesired set of wavelengths. However, to obtain high resolution in the illustrated example, each set of reflected wavelengths is reflected and dispersed a second time by the diffraction grating 40 (not shown). Therefore, the configuration of the wedge stack 75 is coordinated with the spacing and wavelength separation of the diffraction grating 40 to direct the sufficiently dispersed sets of desired wavelengths onto appropriate locations on the detector array. Also included in the optical communications system 10 is focusing optics 80, which is a group of optical elements (lenses) that focus the incoming sets of dispersed wavelength ranges, now possessing an orthogonal deviation from one another due to the wedge filter stack function, onto detectors 85. The operation of the focusing optics 80 is to image the now two-dimensionally dispersed and deviated individual wavelength channels onto the detectors 85.

In operation, the optical spectroscopy system 10 in FIG. 1 analyzes and/or detects the individual wavelengths or channels of the incoming light from the light source 15. The light source 15 shines divergent light 20 into the collimating optics 25. The light 20 is then collimated into a uniform beam 35 containing multiple wavelengths or channels. The uniform beam 35 is then reflected by the mirror 30 onto the diffraction grating 40. The diffraction grating 40 disperses the individual wavelengths one-dimensionally onto the wedge stack 75. This is illustrated in FIG. 1 by wavelength set components 45 and 50. The wedge stack 75 filters out undesired wavelengths by transmitting them through the entire wedge stack 75 rather than reflecting them.

The selected wavelength set components are individually reflected off one of the corresponding optical wedges within the wedge stack 75. Each optical wedge reflects a desired wavelength set at a unique one or two-dimensional angle. This is illustrated by reflecting incoming wavelength component sets 45, 50 into the corresponding reflected channel groups 55, 60. The reflected channel groups 55, 60 are reflected at specific angles 65, 70 with respect to the corresponding incoming wavelength components 45, 50. By controlling the angle of reflection of the reflected channel groups, the wedge stack 75 is able to spatially position the reflected channel groups 55, 60 onto a specific location on the diffraction grating 40. The diffraction grating 40 reflects each of the one or two-dimensionally separated reflected channels 55, 60 at a known angle onto the focusing optics 80. The focusing optics 80 focus the reflected sets of wavelengths or channel groups 55, 60 onto the detection array 85.

Figure 2A:
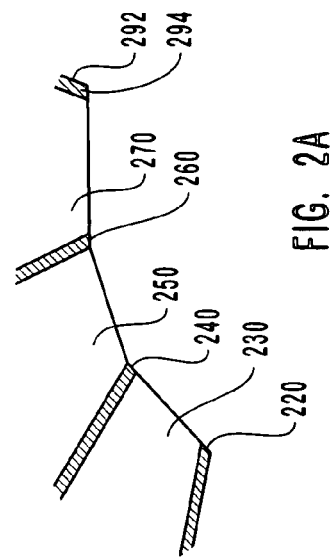
FIG. 2A is a top down cross sectional view of a portion of FIG. 2 which includes three of the wedges and three reflection layers.
Figure 2:
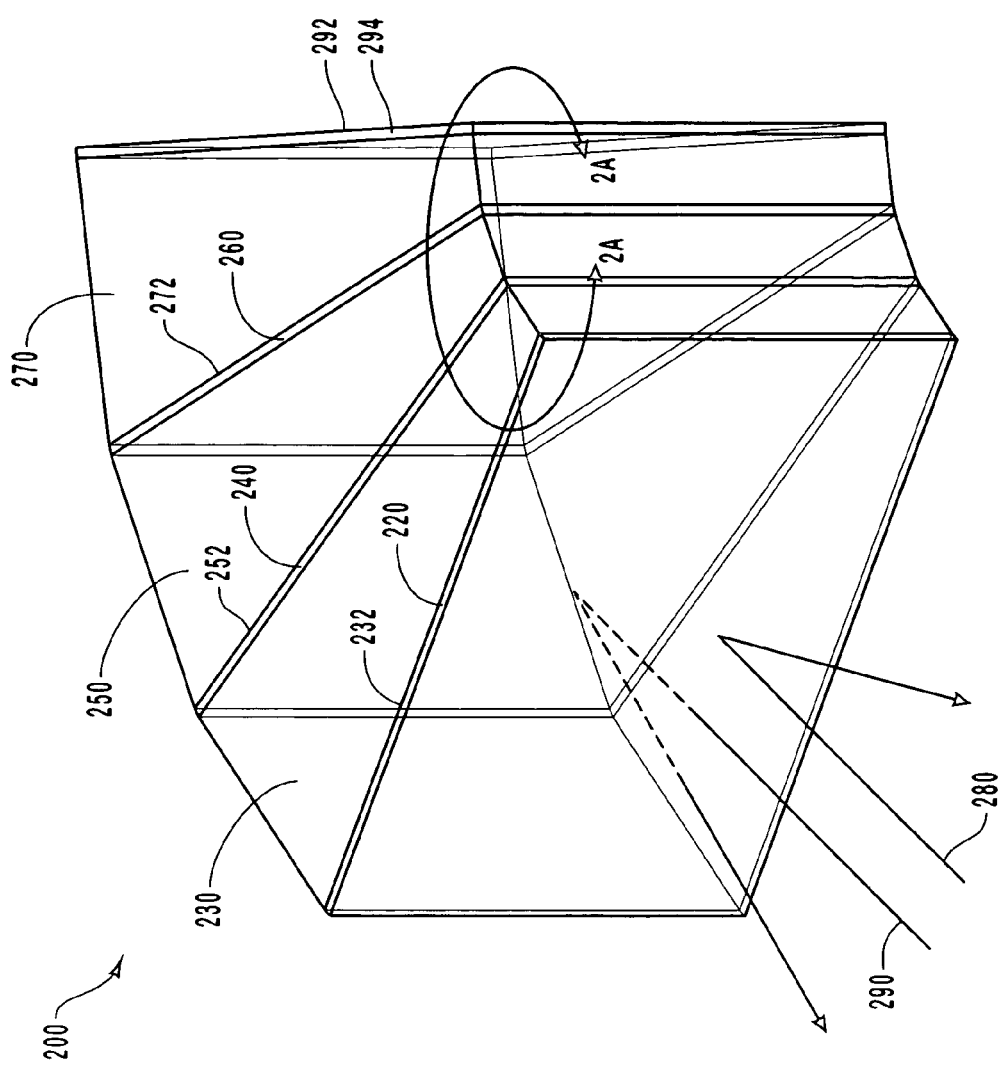
FIG. 2 is a perspective view of one presently preferred embodiment of an optical reflection device comprising optical members with continuous linear two-dimensional slopes.

Reference is next made to FIG. 2, which illustrates one presently preferred embodiment of an optical reflection device or wedge stack, designated generally as 200, is shown. In this embodiment, the wedge stack 200 includes a plurality of optical members, or wedges 230, 250 and 270. As will be described below, each wedge 230, 250 and 270 has a generally planar reflective surface. Formed on at least a portion of each reflective surface 232, 252, 272 is a reflective layer 220, 240, 260; the reflective layers 220, 240, 260 are also shown in the cross section FIG. 2A. Each reflective layer 220, 240, 260 includes a material that reflects a predetermined set of wavelengths or channel groups of light, and that allows other wavelengths to transmit through the wedge.

FIG. 2 also illustrates an optional embodiment in which an additional reflective layer 294 having a reflective surface 292 is formed on the rear surface of the bottom wedge 270, which enables an additional wavelength to be reflected by the wedge stack 200.

As is also shown in the embodiment of FIG. 2, the plurality of wedges 230, 250 and 270 are interconnected in a manner so that each of the planes formed by their respective reflective surfaces 232, 252 and 272 is oriented at a unique slope with respect to the other reflective surfaces. This physical arrangement, along with the characteristics of the z corresponding reflective layers or reflective coatings 220, 240 and 260, allows the optical reflection device to reflect individual sets wavelengths of a light signal at predetermined angles. This is illustrated by the schematic lines 280 and 290 that correspond to individual wavelengths sets or channel groups. The schematic line 280 is shown to reflect off the reflective coating 220 contained on the reflective surface 232 of the first wedge 230. Therefore, the reflective coating 220 in the illustrated embodiment is configured to reflect the particular set of wavelengths represented by the schematic line 280.

The wavelengths represented by schematic line 290 are transmitted through the first reflective coating 220. The reflective coating 220 is configured to transmit the particular wavelength represented by the schematic line 290. The wavelength represented by schematic line 290 is transmitted through the wedge 230 because the wedge is composed of a transparent material. The wavelength sets represented by schematic line 290 are reflected off the reflective coating 240 located between wedge 230 and wedge 250. The schematic line 290 is reflected at a different angle from the schematic line 280. The reflective coating 240 is configured to reflect the wavelengths represented by schematic line 290.

Figure 4:
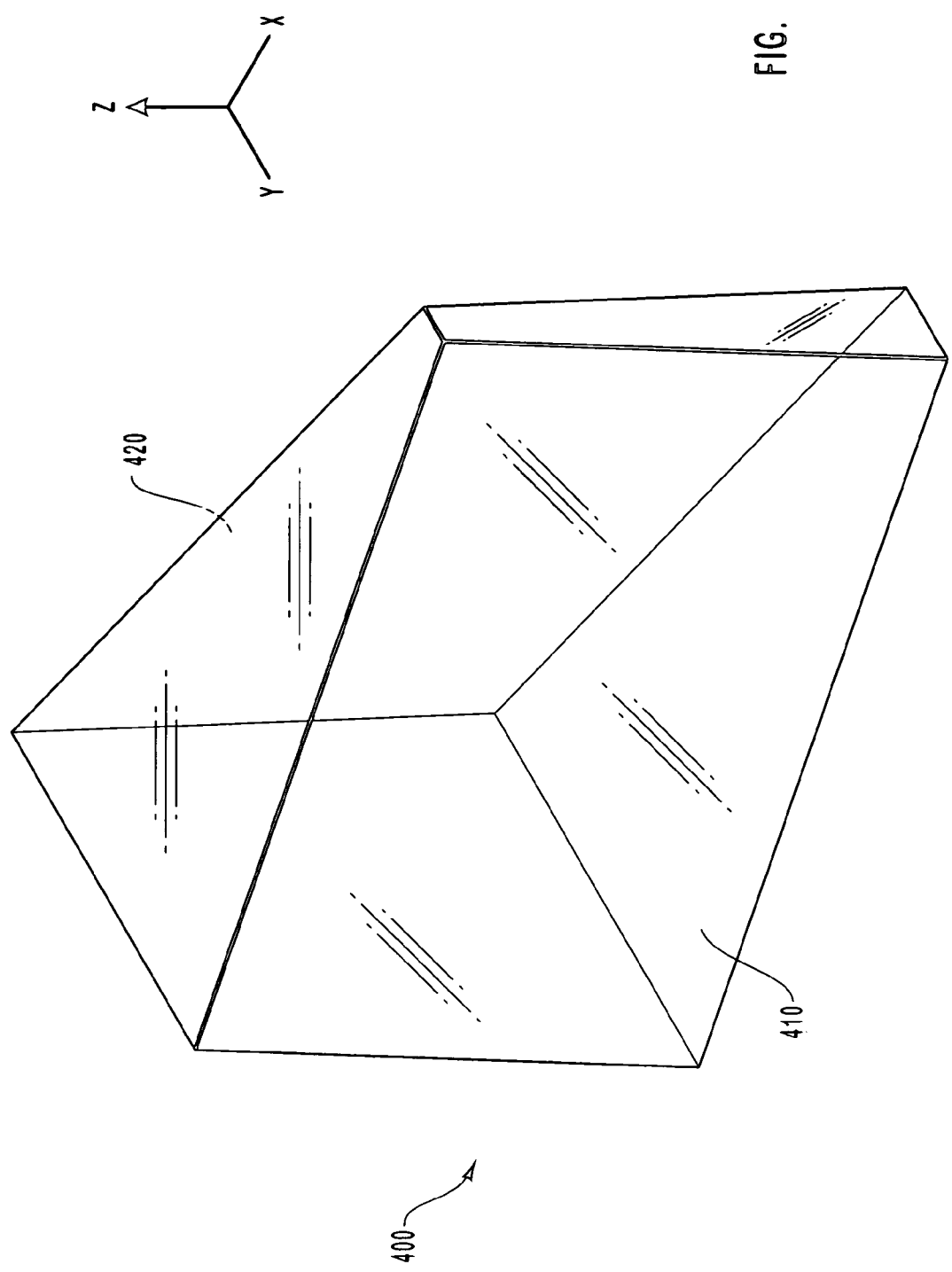
FIG. 4 is a perspective view of one presently preferred embodiment of an optical member with a continuous linear two-dimensional slope.

Reference is next made to FIG. 4, which illustrates in further detail one presently preferred embodiment of an individual optical member, or wedge, portion of a reflection device. FIG. 4 is a perspective view of an optical member with a continuous linear two-dimensional slope, generally designated by reference numeral 400. The orthogonal wedge angle is exaggerated for sake of diagram clarity only and is not representative of a standard wedge. The wedge 400 is defined generally by a reflective surface 410 and a rear face 420. The wedge 400 is composed of a transparent material, such as BK7 glass. As seen in FIG. 4, the reflective surface 410 is opposite the rear face 420, but the reflective surface is sloped at an angle both horizontally (in the plane of dispersion) and vertically (orthogonal to the plane of dispersion) with respect to the rear face 420. The reflective surface 410 is said to be a continuous linear two-dimensional slope because the reflective surface is angled in both the XY and the XZ planes.

One advantage of using the wedges that are sloped in two dimensions is that a two-dimensional array of detectors can be used in combination with the wedge stack of this embodiment of the invention. Two-dimensional detector arrays have the benefit of being more compact and using space more efficiently than one-dimensional detector arrays.

Figure 3:
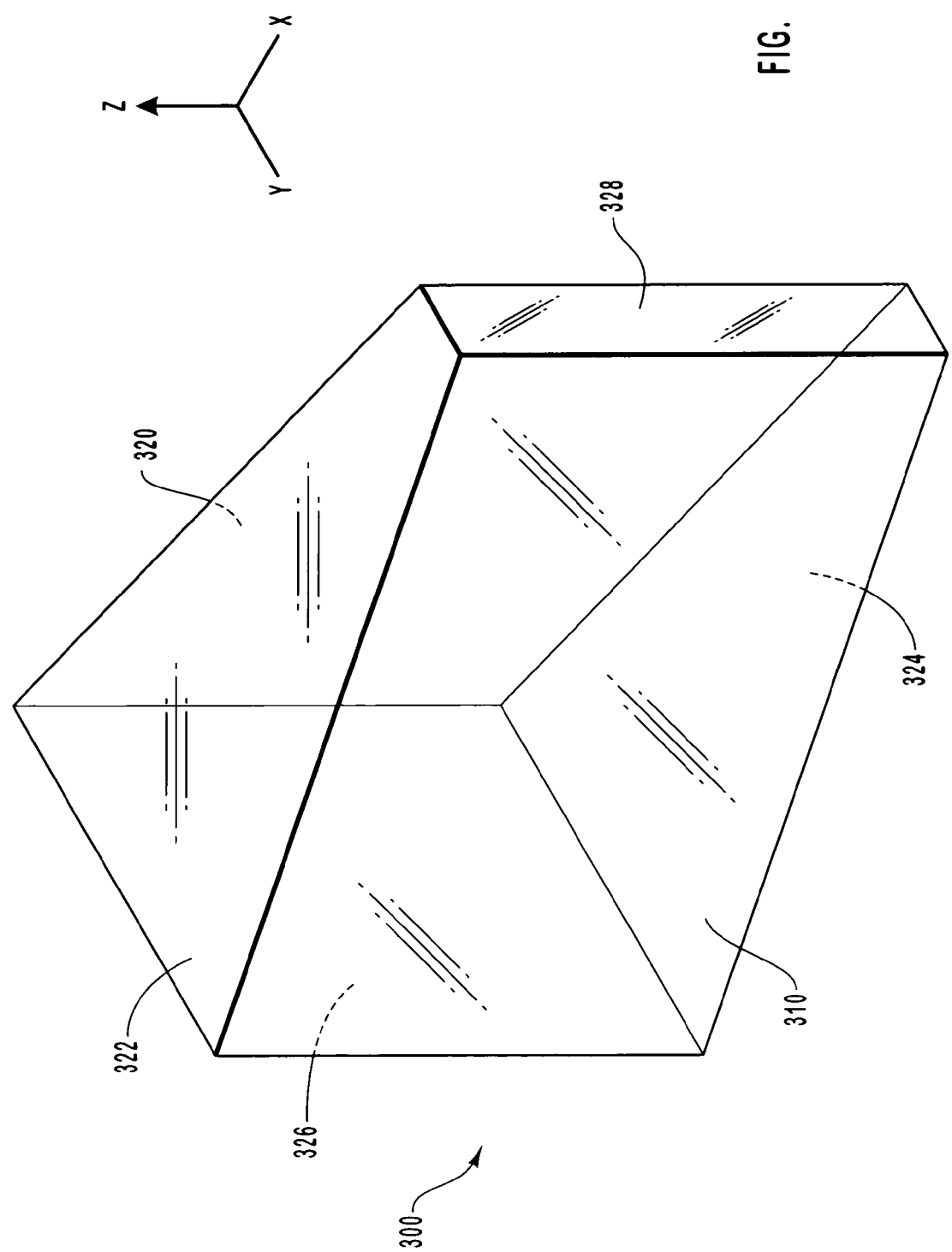
FIG. 3 is a perspective view of one embodiment of an optical member with a continuous linear one dimensional slope.

Although wedges that slope in two dimensions have the advantages described herein, the principles of the invention can also be applied to optical devices with wedges that slope in only one direction. However, optical devices constructed with wedges sloped in only one dimension generally require a linear detector array. FIG. 3 illustrates in further detail one embodiment of an individual optical member, or wedge, portion of a reflection device. FIG. 3 is a perspective view of a wedge with a continuous linear one-dimensional slope, generally designated at 300. The wedge 300 is defined generally by a reflective surface 310, a rear face 320, a top 322, a bottom 324, a large side surface 326, and a small side surface 328. The wedge 300 is composed of a transparent material, such as BK7 glass. As seen in FIG. 3, the reflective surface 310 is opposite the rear face 320 and is sloped at an angle with respect to the rear face 320. The reflective surface 310 is said to be a continuous one-dimensional slope because the reflective surface is only angled in the XY plane, meaning it has a one dimensional angle. In addition to the one and two-dimensional linear slopes of FIGS. 3 and 4, the slopes can alternatively be discontinuous and/or non-linear as necessary to obtain desired angles of reflection.

Figure 3A:
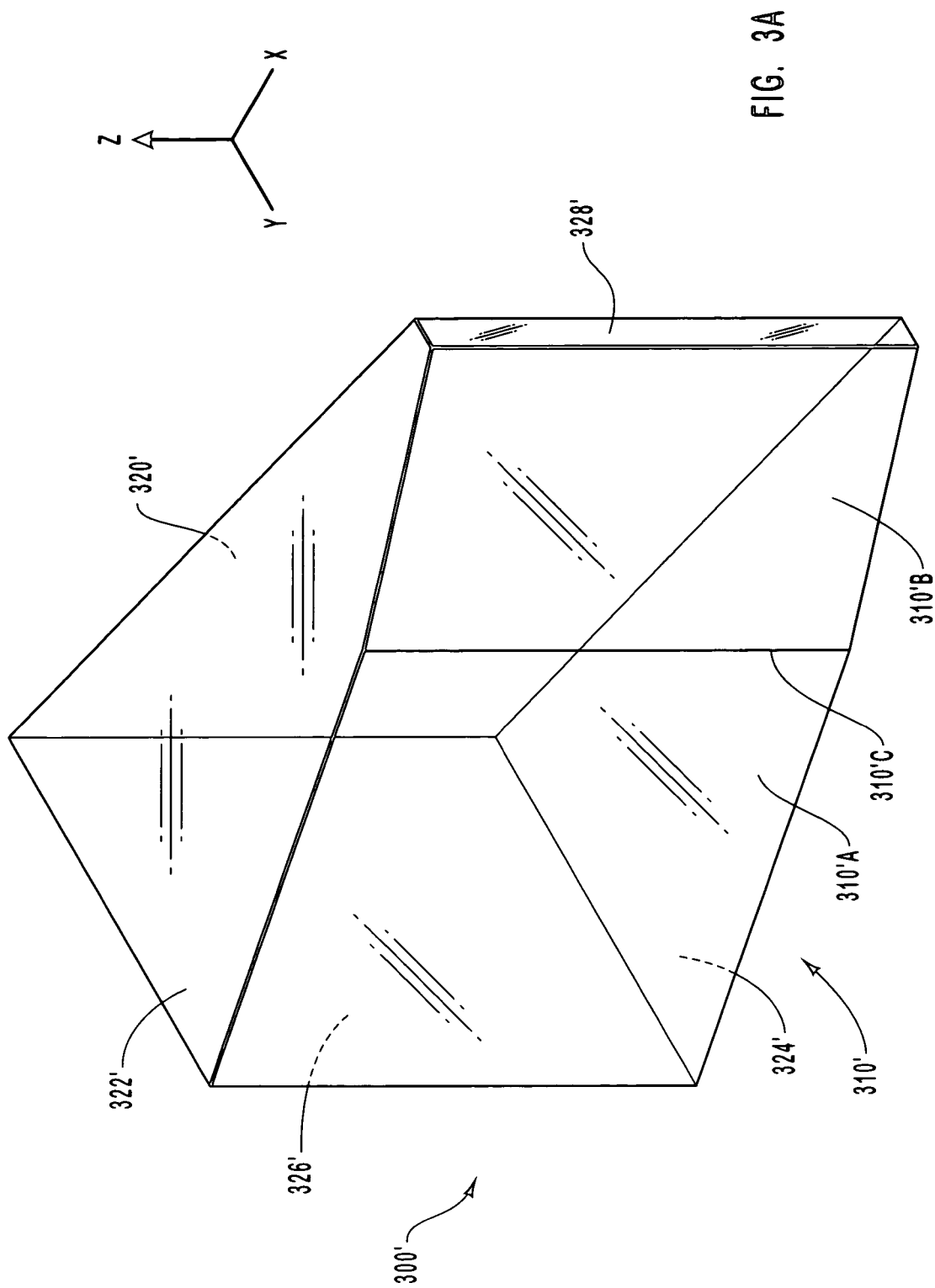
FIG. 3A is a perspective view of an alternative embodiment of an optical member having a reflective surface with a partially discontinuous slope.

As disclosed herein, some embodiments of wedges include a reflective surface having a slope that is at least partially discontinuous. With attention now to FIG. 3A, an alternative embodiment of an individual optical member, or wedge, portion of a reflection device is disclosed. Particularly, FIG. 3A discloses a perspective view of a wedge 300' having a reflective surface 310' with a slope that is at least partially discontinuous. In the illustrated embodiment, the reflective surface 310' comprises a first portion 310'A and a second portion 310'B. The edge 310'C between first portion 310'A and the second portion 310'B denotes a discontinuity in the slope of the reflective surface 310'. Of course, discontinuities in the slope of a reflective surface may be implemented in a variety of different ways. Accordingly, aspects such as the geometry, location, orientation, extent and size of the exemplary discontinuity disclosed in FIG. 3A are exemplary only and are not intended to limit the scope of the invention in any way, nor is the scope of the invention limited to devices having a reflective surface whose slope possesses a single discontinuity. More generally, the scope of the invention is not limited to the exemplary wedge 300' disclosed in FIG. 3A. Finally, the exemplary wedge 300' includes, in addition to the reflective surface 310', a rear face 320', a top 322', a bottom 324', a large side surface 326', and a small side surface 328'.

Figure 5:
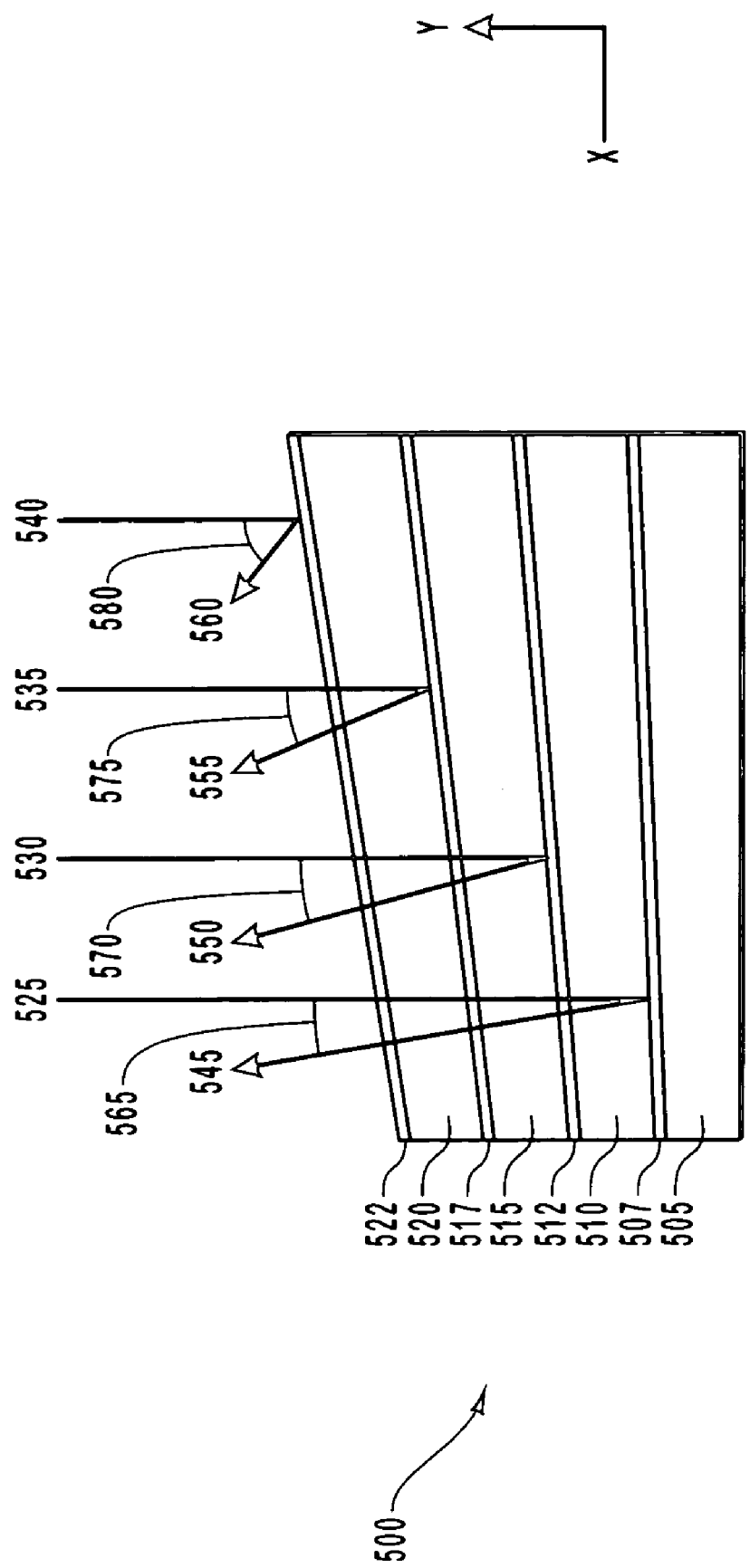
FIG. 5 is a profile view of one embodiment of an optical reflection device in operation showing a schematic ray trace of four different wavelengths or channels.

Reference is next made to FIG. 5, which illustrates in further detail one presently preferred embodiment of an optical reflection device, or wedge stack. FIG. 5 is a profile view of one embodiment of a wedge stack 500 in operation with a schematic ray trace of four different wavelength sets or channel groups, with the reflection angles being exaggerated for purposes of illustration. The wedge stack 500 includes a first wedge 505, a first reflective coating 507, a second wedge 510, a second reflective coating 512, a third wedge 515, a third reflective coating 517, a fourth wedge 520, a fourth reflective coating 522, a first incident channel group 525, a second incident channel group 530, a third incident channel group 535, a fourth incident channel group 540, a first reflected channel group 545, a second reflected channel group 550, a third reflected channel group 555, a fourth reflected channel group 560, a first reflection angle 565, a second reflection angle 570, a third reflection angle 575 and a fourth reflection angle 580. It is to be understood that the four incident channel groups 525, 530, 535, 540 have been previously dispersed by some form of dispersion member, such as a prism or a diffraction grating. In reference to FIG. 5 and as used herein and in the claims, the normal direction is defined to be parallel with respect to the direction of incidence of the light, which in the example of FIG. 5 is in the Y direction.

In operation, the first incident channel group 525 contacts the fourth reflective coating 522 but is transmitted through the fourth reflective coating 522 because the fourth reflective coating 522 is not configured to reflect the first incident channel group 525. The first incident channel group 525 is transmitted through the fourth wedge 520. The wedge is preferably made of some form of transparent glass like substance that will transmit light without distortion, such as BK7 glass. FIG. 5 does not depict refraction effects due to Snell's law. The refraction of the incident channel groups must be taken into account when using the wedge stack 500 to direct the desired reflected channel groups to the particular direction for the secondary (dispersion off of the grating, ultimately placing each individual channel in the particular location on the two-dimensional array for proper wavelength detection.

The first incident channel group 525 contacts the third reflective coating 517 but is transmitted because the third reflective coating 517 is not configured to reflect the first incident channel group 525. The first incident channel group 525 is transmitted through the third wedge 515. The first incident channel group 525 contacts the second reflective coating 512 but is transmitted because the second reflective coating 512 is not configured to reflect the first incident channel group 525. The first incident channel group 525 is transmitted through the second wedge 510. The first incident channel group 525 contacts the first reflective coating 507 and is reflected because the reflective coating is configured to reflect that channel group. The first incident channel group 525 becomes the first reflected channel group 545 upon reflecting from the first reflective coating 507. The first reflected channel group 545 forms a first reflected angle 565 with respect to normal upon reflection. The first reflected channel group 545 is then transmitted back through each of the layers. Once again, refraction effects occur on the first reflected channel group 545 and must be taken into consideration.

The second incident channel group 530 contacts the fourth reflective coating 522 and is transmitted because the fourth reflective coating 522 is not configured to reflect the second incident channel group 530. The second incident channel group 530 is transmitted through the fourth wedge 520. The second incident channel group 530 contacts the third reflective coating 517 but is transmitted because the third reflective coating 517 is not configured to reflect the second incident channel group 530. The second incident channel group 530 is transmitted through the third wedge 515. The second incident channel group 530 contacts the second reflective coating 512 and is reflected because the second reflective coating 512 is configured to reflect the second incident channel group 530. The second incident channel group 530 becomes the second reflected channel group 550 upon reflecting from the second reflective coating 512. The second reflected channel group 550 forms a second reflected angle 570 with respect to normal upon reflection. The second reflected channel group 550 is then transmitted back through each of the layers through which the corresponding incident channel group has passed.

The third incident channel group 535 contacts the fourth reflective coating 522 and is transmitted because the fourth reflective coating 522 is not configured to reflect the third incident channel group 535. The third incident channel group 535 is transmitted through the fourth wedge 520. The third incident channel group 535 contacts the third reflective coating 517 and is reflected because the third reflective coating 517 is configured to reflect the third incident channel group 535. The third incident channel group 535 becomes the third reflected channel group 555 upon reflecting from the third reflective coating 517. The third reflected channel group 555 forms a third reflected angle 575 with respect to normal upon reflection. The third reflected channel group 555 is then transmitted back through each of the layers through which the corresponding incident channel group has passed.

The fourth incident channel group 540 contacts the fourth reflective coating 522 and is reflected because the fourth reflective coating 522 is configured to reflect the fourth incident channel group 540. The fourth incident channel group 540 becomes the fourth reflected channel group 560 upon reflecting from the fourth reflective coating 522. The fourth reflected channel group 560 forms a fourth reflected angle 580 with respect to normal upon reflection.

The reflective coatings within the wedge stack 500 can be configured in different ways to reflect the desired channel groups. For example, reflective coatings that act as high-pass filters (pass wavelengths above a certain point) can be used by placing the highest high-pass filter near the top or input portion of the wedge stack; each of the remaining coatings has a lower pass point in reference to the coating immediately above it. This allows individual channel groups to be reflected by each reflective coating. Reflective coatings that act more as band-pass filters can be used to individually select the channel groups to be reflected by each coating.

When an incident beam is reflected by a reflective coating, the angle of reflection is determined by the angle or slope of the wedge. Therefore, the first reflection angle 565 is determined primarily by the slope of the first wedge 505. But as the wedges are stacked on top of one another, their slopes in reference to normal are summed. Therefore, the second reflection angle 570 is determined primarily by the slope of the first wedge 505 in summation with the slope of the second wedge 510. The third reflection angle 575 is then determined primarily by the slope of the sum of the first, second and third wedges 505, 510, 515. The fourth reflection angle 580 is determined primarily by the sum of the slopes of all four wedges 505, 510, 515, 520. Therefore, in the displayed embodiment, the fourth reflection angle 580 is most likely the largest because it is primarily determined by the summation of all four wedge slopes. Likewise, the first reflection angle 565 is most likely the smallest because it is primarily determined by only the slope of the first wedge 505. Since the light incident on the wedge stack is already dispersed into its wavelength components, each wavelength set or channel group possesses its own reflection and refraction angle before and after its interaction with the wedge stack. It should also be noted that it is possible to use identical optical wedges for each element of the wedge stack and still achieve control over the locations of each reflected channel, due to the summing effect of the wedge angles described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical device, comprising:
   a plurality of optical members joined together to form a stack, each optical member including:
      a reflecting surface having a corresponding slope, the slope of the reflecting surface of one of the optical members being different from the slope of the reflecting surface of another of the optical members; and
      a material, disposed on the reflecting surface, that is reflective for at least one particular wavelength of light, and one of the optical members being reflective for a different wavelength of light than another of the optical members,
   wherein the slope of the reflecting surface of at least one of the plurality of optical members is at least partially discontinuous.

2. The optical device as recited in claim 1, wherein at least one of the plurality of optical members is substantially in the shape of a wedge.

3. The optical device as recited in claim 1, wherein at least one of the plurality of optical members substantially comprises glass.

4. The optical device as recited in claim 1, wherein a rear surface of one optical member is attached to the reflecting surface of an adjacent optical member.

5. The optical device as recited in claim 1, wherein at least one of the optical members serves as a high-pass filter.

6. The optical device as recited in claim 1, wherein at least one of the optical members serves as a band-pass filter.

7. The optical device as recited in claim 1, wherein at least two of the optical members are configured and arranged so that a reflection angle of an optical signal of a first wavelength associated with one of the at least two optical members is different than a reflection angle of an optical signal of a second wavelength associated with another of the at least two optical members.

8. The optical device as recited in claim 1, wherein the reflecting surface of at least one of the plurality of optical members slopes in two different planes.

9. The optical device as recited in claim 1, wherein the reflecting surface of at least one of the plurality of optical members slopes substantially within a single plane.

10. The optical device as recited in claim 1, wherein the slope of the reflecting surface of at least one of the plurality of optical members is one of: substantially linear; and, substantially non-linear.

11. The optical device as recited in claim 1, wherein the slope of the reflecting surface of at least one of the plurality of optical members is substantially continuous.

12. The optical device as recited in claim 1, wherein at least one of the plurality of optical members has a reflecting surface that is sloped relative to a rear face of that at least one optical member.

13. The optical device as recited in claim 1, wherein the plurality of optical members includes a bottom optical member having a rear surface upon which is disposed a material that is reflective for at least one particular wavelength of light.

14. The optical device as recited in claim 1, wherein the stack has a top and a bottom and is configured such that the magnitude of an angle formed by each reflective surface with respect to a reference becomes increasingly larger from the bottom of the stack to the top of the stack.

15. The optical device as recited in claim 2, wherein each optical member has substantially the same wedge shape.

16. The optical device as recited in claim 2, wherein one or more of the optical members has a wedge shape that is different from one or more of the other optical members.

17. An optical device, comprising:
a plurality of optical members joined together to form a stack having a top and a bottom, each optical member being substantially in the form of a wedge and a reflection angle associated with each optical member being defined at least in part by any optical members disposed between that optical member and the bottom of the stack, and each optical member including:
a reflecting surface having a corresponding slope, wherein the slope of the reflecting surface of at least one of the plurality of optical members is at least partially discontinuous; and
a material, disposed on the reflecting surface, that is reflective for at least one particular wavelength of light such that each of the optical members is reflective for a different wavelength of light.

18. The optical device as recited in claim 17, wherein, for each optical member, the reflective surface of the optical member is sloped relative to a rear surface of the optical member.

19. The optical device as recited in claim 18, wherein, for at least one optical member, the reflective surface of that at least one optical member slopes in two different planes relative to the rear surface of that at least one optical member.

20. The optical device as recited in claim 18, wherein, for at least one optical member, the reflective surface of that at least one optical member slopes substantially within a single plane relative to the rear surface of that at least one optical member.

21. The optical device as recited in claim 18, wherein, for each optical member, the slope formed by the reflective surface of that optical member with respect to the rear surface of that optical member is a linear, two-dimensional slope.

22. The optical device of claim 18, wherein, for each optical member, the slope formed by the reflective surface of that optical member with respect to the rear surface of that optical member is a linear, one-dimensional slope.

23. The optical device of claim 18, wherein, for each optical member, the slope formed by the reflective surface of that optical member with respect to the rear surface of that optical member is an at least partially discontinuous, non-linear slope.

24. The optical device of claim 18, wherein the slope is substantially the same for each of the optical members.

25. The optical device of claim 18, wherein the slope is different for each of the optical members.

26. The optical device as recited in claim 17, wherein at least one of the plurality of optical members substantially comprises BK 7 glass.

27. The optical device as recited in claim 17, wherein a rear surface of one optical member is attached to the reflecting surface of an adjacent optical member.

28. The optical device as recited in claim 17, wherein the stack is configured such that the magnitude of an angle formed by each reflective surface with respect to a reference becomes increasingly larger from the bottom of the stack to the top of the stack.

* * * * *